(12) United States Patent
Andalam et al.

(10) Patent No.: US 11,913,344 B2
(45) Date of Patent: Feb. 27, 2024

(54) MULTI-TUBE SERVICING TOOL AND METHOD OF SERVICING GAS TURBINE ENGINE COMPONENTS

(71) Applicant: General Electric Company, Schenectady, NY (US)

(72) Inventors: Satya Mohan Vamsi Andalam, Bangalore (IN); Shivakumar Basavanna, Mullur (IN); Sandeep Kumar, Bangalore (IN); Mandar Diwakar Godbole, Bangalore (IN); Vamshi Krishna Reddy Kommareddy, Bangalore (IN)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 17/226,683

(22) Filed: Apr. 9, 2021

(65) Prior Publication Data
US 2022/0268170 A1    Aug. 25, 2022

(30) Foreign Application Priority Data

Feb. 25, 2021   (IN) .............................. 202111007984

(51) Int. Cl.
| | | |
|---|---|---|
| *F01D 21/00* | (2006.01) | |
| *G01M 15/14* | (2006.01) | |
| *G01N 21/954* | (2006.01) | |

(52) U.S. Cl.
CPC ........... *F01D 21/003* (2013.01); *G01M 15/14* (2013.01); *G01N 21/954* (2013.01); *F05D 2220/323* (2013.01); *F05D 2230/72* (2013.01); *F05D 2260/80* (2013.01); *F05D 2260/83* (2013.01)

(58) Field of Classification Search
CPC ...... F01D 21/003; F01D 5/005; F01D 25/285; G01N 21/954; G01M 15/14; B64F 5/60
USPC ....................................... 356/241.6
See application file for complete search history.

(56) References Cited

U.S. PATENT DOCUMENTS

| | | | |
|---|---|---|---|
| 3,778,170 A | * | 12/1973 | Howell .............. G02B 23/2476 |
| | | | 600/114 |
| 4,530,568 A | | 7/1985 | Haduch et al. |
| 4,659,195 A | | 4/1987 | D'Amelio et al. |
| 4,784,117 A | | 11/1988 | Miyazaki |
| 4,998,282 A | | 3/1991 | Shishido et al. |
| 5,381,226 A | | 1/1995 | Brunell et al. |

(Continued)

FOREIGN PATENT DOCUMENTS

| | | |
|---|---|---|
| EP | 3262729 A1 | 1/2018 |
| EP | 3698023 A1 | 8/2020 |

(Continued)

*Primary Examiner* — J. Todd Newton
(74) *Attorney, Agent, or Firm* — Fitch, Even, Tabin & Flannery LLP

(57) ABSTRACT

A method of servicing a portion of a gas turbine engine includes inserting a rigid guide tube into an inspection port in a shroud of the gas turbine engine. The flexible guide tube is inserted into and through the rigid guide tube. The flexible guide tube is pre-shaped such that the flexible guide tube is biased towards a predetermined shape after being inserted through the rigid guide tube. A tool is pushed through the flexible guide tube such that the distal end of the tool moves out of and away from an end of the flexible guide tube. An area of interest of the gas turbine engine is then serviced with the tool.

20 Claims, 9 Drawing Sheets

(56) References Cited

U.S. PATENT DOCUMENTS

| | | |
|---|---|---|
| 9,016,159 B2 | 4/2015 | Kell et al. |
| 9,261,693 B2 * | 2/2016 | Konomura et al. |
| 9,403,244 B2 * | 8/2016 | Rautenberg ........... F01D 21/003 |
| 9,912,848 B2 | 3/2018 | Baleine et al. |
| 10,697,317 B2 | 6/2020 | Bailey et al. |
| 2017/0234772 A1 | 8/2017 | Nirmalan et al. |
| 2018/0031489 A1 | 2/2018 | Waldie |
| 2018/0119568 A1 | 5/2018 | Negoescu |
| 2018/0156062 A1 * | 6/2018 | Dede ........................ B05D 1/02 |
| 2019/0330997 A1 | 10/2019 | Norton et al. |
| 2020/0319119 A1 | 10/2020 | Peters et al. |
| 2020/0346310 A1 * | 11/2020 | Huttner ................ B23Q 9/0007 |

FOREIGN PATENT DOCUMENTS

| | | | | |
|---|---|---|---|---|
| JP | 2010158396 A | * | 7/2010 | ............... A61B 1/00 |
| JP | 2010158396 A | | 7/2010 | |
| JP | 5276998 B2 | | 8/2013 | |
| JP | 5606812 B2 | | 10/2014 | |
| WO | WO2020148036 A1 | | 7/2020 | |

* cited by examiner

MULTI-TUBE SERVICING TOOL AND METHOD OF SERVICING GAS TURBINE ENGINE COMPONENTS

FIELD

The present disclosure relates to inspection of gas turbine engines. In particular, the present disclosure relates to a borescopic inspection tool and a method of servicing components of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

In existing gas turbine engines, visual inspection of the various components throughout the engine can be difficult. In particular, internal fasteners and their surrounding environments within gas turbine engines can be especially difficult to inspect due to confined spaces and complex pathways in the interiors of the compressor, the combustion chamber, and the turbine of the engine.

BRIEF DESCRIPTION

Aspects and advantages of the disclosure will be set forth in part in the following description, or may be obvious from the description, or may be learned through practice of the disclosure.

A method of servicing a portion of a gas turbine engine includes inserting a rigid guide tube into an inspection port in a shroud of the gas turbine engine. The flexible guide tube is inserted into and through the rigid guide tube. The flexible guide tube is pre-shaped such that the flexible guide tube is biased towards a predetermined shape after being inserted through the rigid guide tube. A tool is pushed through the flexible guide tube such that the distal end of the tool moves out of and away from an end of the flexible guide tube. An area of interest of the gas turbine engine is then serviced with the tool.

A multi-tube assembly for servicing a gas turbine engine includes a tool, a preformed flexible guide tube, and a rigid guide tube. The tool includes a body and a distal end. The preformed flexible guide tube forms an internal passage that is configured to receive the tool. The rigid guide tube forms a central cavity extending through the rigid guide tube. The central cavity is configured to receive the preformed flexible guide tube and to allow the preformed flexible guide tube to pass through the rigid guide tube. An outer surface of the preformed flexible guide tube is disposed to slide relative to an inner surface of the rigid guide tube.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
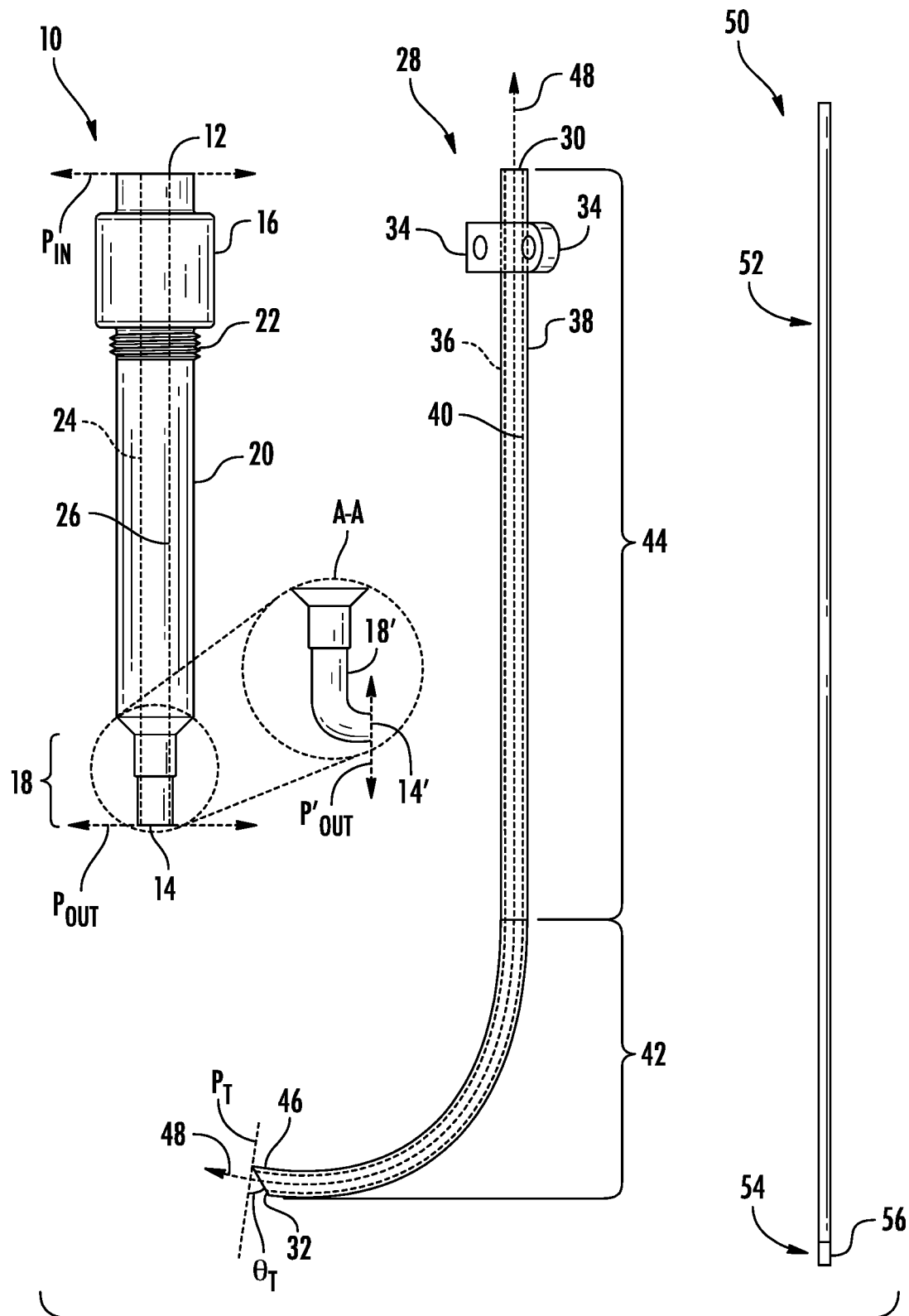
FIG. 1 is a side view of a rigid guide tube, a flexible guide tube, and a borescope.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure proposes a tube-inside-tube concept with a rigid outer tube and pre-shaped flexible guide tube to aid a borescope in crossing more than one rotor/stator stage to arrive at an inspection sight within the engine. A staged insertion of the rigid outer tube into a borescope inspection port, then insertion of the borescope into the flexible guide tube, and then insertion of the flexible guide tube with the borescope into the rigid guide tube enables manipulation of the flexible guide tube past interior components of the engine to deliver the borescope tip to a specific area of interest that may otherwise be inaccessible with other inspection means.

FIG. 1 is a side view showing a rigid guide tube 10 (with rigid guide tube 10 defining an inlet 12 and an outlet 14 and rigid guide tube 10 including a collar 16, a tip 18, an outer surface 20, a threaded portion 22, rigid guide tube 10 defining a central cavity 24 (depicted in phantom), and an inner surface 26), a flexible guide tube 28 (with flexible guide tube 28 defining an inlet 30 and an outlet 32 and flexible guide tube 28 including wings 34, flexible guide tube 28 defining an internal passage 36 (depicted in phantom), an outer surface 38, an inner surface 40, a first portion 42, a second portion 44, a tip 46, and an axial centerline 48), and a tool 50 (with a body 52, a distal end 54, and a sensor 56). As shown in FIG. 1, rigid guide tube 10, flexible guide tube 28, and tool 50 are shown in a dissembled state where rigid guide tube 10, flexible guide tube 28, and tool 50 are separated from each other.

Rigid guide tube 10 is a tube of solid material. In one example, a material of rigid guide tube 10 can be metal. For example, the rigid guide tube 10 may be formed of a material defining a Young's modulus between 1 and 250 GPa. Inlet 12 and outlet 14 are openings or orifices disposed on opposite ends of rigid guide tube 10 from each other. Collar 16 is a thickened ring of solid material. Tip 18 is an end of rigid guide tube. In this example, tip 18 has a smaller outer diameter than other portions of rigid guide tube 10. Also in this example, a shape of tip 18 includes a cylinder or linear tube. In another example, a shape of tip 18 can include a curve. For example, see area A-A shown in FIG. 1. Area A-A provide an alternate view with outlet 14' and tip 18' Here, tip 18' is shown as having a curved shape. The effect of this curved shape of tip 18' is that outlet 14' opens up in a direction that is different than a direction of inlet 12. For example, outlet 14 of tip 18 extends along a plane $P_{OUT}$ that is approximately parallel to a plane PIN along which inlet 12 extends. In contrast, outlet 14' of tip 18' (shown in area A-A) extends along a plane $P_{OUT}$ that is approximately perpendicular to plane along which inlet 12 extends, with tip 18' including a curve of approximately 90° (e.g., π/2 radians). In other examples, tip 18' can include of more or less than approximately 90° (e.g., π/2 radians).

Outer surface 20 is an outward facing surface along the radial direction of rigid guide tube 10. Threaded portion 22 is a ring with screw threading. Central cavity 24 is an internal passage or opening. In this example, a cross-section shape of central cavity 24 can be a circle. Inner surface 26 is an inward facing surface along the radial direction of rigid guide tube 10.

Flexible guide tube 28 is an elongate tube. In this example, flexible guide tube 28 is semi-flexible and a material of flexible guide tube 28 can include an elastomer (or reinforced elastomers) such as polyurethane or ethylene-vinyl acetate (EVA) or polytetrafluoroethylene (PTFE) or perfluoroalkoxy alkanes (PFA). Flexible guide tube 28 includes a preformed shape (see e.g., first portion 42), can be semi-flexible and semi-rigid, and is capable of elastically deforming. In such a manner, the flexible guide tube 28 may be formed of a material with a Shore Durometer hardness value from 60 A to 95 A or from 45 D to 70 D. For example, flexible guide tube 28 is preformed such that flexible guide tube 28 retains its shape after being deformed. In such a manner, the flexible guide tube 28 is biased towards a predetermined shape after being elastically deformed.

Inlet 30 and outlet 32 are openings or orifices disposed on opposite ends of flexible guide tube 28. Wings 34 are tabs or planar protrusions of solid material. Internal passage 36 is a completely or substantially enclosed opening extending along a length of the flexible guide tube 28. In this example, a cross-section shape of internal passage 36 can be a circle.

Outer surface 38 is an outward facing surface along the radial direction of flexible guide tube 28. In one example, outer surface 38 can include demarcations of length along a longitudinal direction of flexible guide tube 28 (not shown). In another example, flexible guide tube 28 can include demarcations of angular positioning disposed around a circumference of flexible guide tube 28 (not shown). Similarly, rigid guide tube 10 can include demarcations of angular positioning so a user can determine relative angular positioning between rigid guide tube 10 and flexible guide tube 28 during use (not shown).

Inner surface 40 is an inward facing surface along the radial direction of flexible guide tube 28. First portion 42 is positioned at one end of flexible guide tube 28. In this example, first portion 42 is curved or non-linear. Here, first portion 42 is shown to include approximately one quarter of a circle. In other examples, first portion 42 can include more than one curve extending along a plane that is parallel or non-parallel to a plane that the curve of first portion 42 extends along. Second portion 44 is a straight, elongate portion of flexible guide tube 28. Tip 46 is an end of flexible guide tube that is distally located from second portion 44. As shown in this example, tip 46 may have an angular cut with respect to the axial centerline 48. Here, angle $\theta_T$ is defined by an angle extending between plane $P_T$ and an end-surface of tip 46. In this example, angle $\theta_T$ is greater than zero. Axial centerline 48 is an imaginary line extending along an axial center-point of flexible guide tube 28.

Tool 50 is a device for servicing or maintaining a complex device such as a gas turbine engine. In this example, tool 50 can be a tool with a controllable tip segment, such as a borescope. Tool 50 can be configured for visual inspection (e.g., a borescope with a controllable tip segment) or other inspection methods such as electro-magnetic testing, laser testing, thermal/infrared testing, or ultra-sonic testing. In other examples, tool 50 may include a plurality of controlled segments (e.g., similar to a borescope tip) one after another. In yet other examples, tool 50 can be configured for: cleaning (e.g., spraying a detergent or solvent); vacuum cleaning; rotary grinding (e.g., burr grinder on a flexible shaft); rotary polishing (e.g., mop on a flexible shaft); applying sealants, adhesives, fillers, and/or braze paste; spraying coatings (e.g., thermal barrier coatings, coating protectors, and/or reactive phase spray coatings); spraying anti-corrosive protectors; lasering to clean (e.g., via fiber optics), to thermal shock peen, to heat (e.g., loosen a fastener), to heat treat, to braze (e.g., conventionally or exothermically), to weld, and/or to remove coatings; and using gas torches to heat, to weld, or to de-coke.

Body 52 is an elongate portion of tool 50. In this example, a cross-section shape of body 52 can be complementary with the cross-section shape of the internal passage 36 of the flexible guide tube 28. In such a manner, the cross-section shape of the body 52 can include a circle. Additionally, body 52 can be semi-flexible and semi-rigid and is capable of elastically deforming. Distal end 54 is a terminal endpoint of tool 50. Sensor 56 is an image sensor. In this example, sensor 56 can be a camera.

When used in combination, rigid guide tube 10, flexible guide tube 28, and tool 50 can be referred to as a borescope inspection tool, a multi-tube assembly, a multi-tube servicing tool and/or as a multi-tube inspection assembly.

As shown in FIG. 1, rigid guide tube 10, flexible guide tube 28, and tool 50 are shown as being separated and disengaged from each other. Inlet 12 is disposed on an end of rigid guide tube 10 that is opposite from tip 18. Inlet 12 opens up into and is connected with central cavity 24. Outlet 14 is disposed on an end of rigid guide tube 10 that is opposite from inlet 12. Outlet 14 opens up into and is connected with central cavity 24.

Collar 16 extends radially outward from outer surface 20 of rigid guide tube 10. Collar 16 include a diameter that is larger than a diameter of other portions of rigid guide tube 10. Tip 18 is disposed on an end of rigid guide tube 10 that is opposite from inlet 12. Outer surface 20 is extends along an outer portion of rigid guide tube extending between tip 18 and threaded portion 22.

Threaded portion 22 is disposed immediately adjacent to collar 16. A plurality of threads of threaded portion 22 extend radially outward from outer surface 20 of rigid guide tube 10. However, in other embodiments, the rigid guide tube 10 may include any other suitable attachment configuration for, e.g., attaching the rigid guide tube to a portion of the gas turbine engine (e.g., clamps, flanges, etc.), positioned at any other suitable location along the rigid guide tube 10.

Central cavity 24 is disposed along a radial center of rigid guide tube 10. Central cavity 24 extends along an entire length of rigid guide tube 10 and connects inlet 12 with outlet 14. Inner surface 26 is disposed along an inner surface of central cavity 24.

Inlet 30 is disposed on an end of flexible guide tube 28 that is opposite from tip 46. Outlet 32 is disposed on an end of flexible guide tube 28 that is opposite from inlet 30. Outlet 32 is fluidly connected to inlet 30 via internal passage 36.

Wings 34 are formed with and extend radially from second portion 44 of flexible guide tube 28. However, in other embodiments, the flexible guide tube 28 may include any other grip portion having a varying geometry to facilitate a user, e.g., gripping, twisting, pushing, pulling, etc. the flexible guide tube 28.

Internal passage 36 is disposed along axial centerline 48 and extends along an entire length of flexible guide tube 28 by extend through both of first portion 42 and second portion 44. Internal passage 36 fluidly connects inlet 30 to outlet 32. Outer surface 38 is disposed on an outer surface of rigid guide tube 28 and extends an entire length of flexible guide tube 28. Inner surface 40 is disposed along an inner surface of internal passage 36.

First portion 42 is connected to second portion 44. In this example, first portion 42 is integrally formed with second portion 44. In other examples, first portion 42 and second portion 44 can be separate pieces that are joined together via a mechanical or chemical connection. Second portion 44 is connected to first portion 42 and extends linearly away from first portion 42. Tip 46 is connected to and is formed on an end of first portion 42. Axial centerline 48 is disposed along an axial centerline of flexible guide tube 28. As shown in FIG. 1, axial centerline 48 of flexible guide tube 28 includes a curved portion that corresponds with the curvature of first portion 42.

Sensor 56 is mounted to body 52 at distal end 54 of tool 50. In one example, tool 50 includes lead wires extending through body 52 to connect sensor 56 to a photography or videography device. Such lead wires are omitted from FIG. 1 for clarity.

As discussed herein, rigid guide tube 10 can be used in conjunction with flexible guide tube 28 to guide tool 50 into portions of a gas turbine engine that are difficult to inspect. In one example, rigid guide tube 10 can be inserted into an inspection port of a gas turbine engine. Inlet 12 can receive flexible guide tube 28 as flexible guide tube is inserted into rigid guide tube 10. During use, flexible guide tube 28 exits out of rigid guide tube 10 at outlet 14. In one example, as rigid guide tube 10 is installed onto a portion of the gas turbine engine, collar 16 can come into contact with a portion of an inspection port such that collar 16 prevents further insertion of rigid guide tube 10 into the inspection port. In this way, collar 16 can be disposed at different locations along rigid guide tube 10 to control the depth to which tip 18 of rigid guide tube 10 is inserted into the gas turbine engine.

Tip 18 is used to guide and support flexible guide tube 28 as flexible guide tube 28 protrudes from rigid guide tube 10.

Tip 18, with its smaller diameter relative to the other sections of rigid guide tube 10, can be utilized to come into contact with an inner inspection port disposed in an inner casing or shroud of the gas turbine engine. Similar to collar 16, this feature of tip 18 can cause rigid guide tube 10 to be inserted up to a pre-determined point and then stopped or prevented from being inserted any farther. Threaded portion 22 threadably engages with a corresponding threaded receptacle on an outer case of the gas turbine engine to mount or temporarily fasten rigid guide tube 10 to the outer casing. Central cavity 24 is configured to receive flexible guide tube 28 and allows flexible guide tube 28 to pass through rigid guide tube 10. Inner surface 26 is disposed to allow outer surface 38 of flexible guide tube 28 to translate across or relative to inner surface 26 of rigid guide tube 10. For example, as used herein, the term "translate" can include at least one of relative linear motion (e.g., longitudinal sliding) or relative angular motion (e.g., twisting/rotating). As shown in FIG. 1, a longitudinal direction of rigid guide tube is up and down.

During use, flexible guide tube 28 inserts into rigid guide tube 10 and is used to guide tool 50 in specific directions during inspection of portions of the gas turbine engine. In this example, flexible guide tube 28 is pre-shaped such that flexible guide tube 28 is biased towards a predetermined shape after being inserted through rigid guide tube 10. Inlet 30 is disposed to receive tool 50. Outlet 32 allows flexible guide tube 28 a point from which to exit from rigid guide tube 10 and flexible guide tube 28 is pushed through rigid guide tube 10. In one example, wings 34 can be used to adjust and/or re-adjust the positioning of flexible guide tube 28 relative to rigid guide tube 10. Wings 34 can be used by a user to push against in order to translate flexible guide tube 28 linearly and/or angularly relative to rigid guide tube 10. Wings 34 can also be used to pull flexible guide tube 28 out of rigid guide tube 10 after inspection of an area of interest of the gas turbine engine is completed. Internal passage 36 is configured to receive tool 50. For example, a diameter of internal passage 36 is greater than an outer diameter of tool 50 so that tool 50 can slide through internal passage 36 of flexible guide tube 28.

In this example, a diameter of outer surface 38 is less than an inner diameter of inner surface 26 of rigid guide tube such that flexible guide tube 28 can slide through central cavity 24 of rigid guide tube 10. First portion 42 is curved to direct and guide tool 50 along the curved shape of first portion 42. For example, as tool 50 is slid through flexible guide tube 28, first portion 42 causes tool 50 to curve along with the curve of first portion 42. As will be discussed below, first portion 42 extends in a generally axial direction during an inspection of a portion of the gas turbine engine. Second portion 44 provides support for first portion 42 as well as provides a length of flexible guide tube 28. For example, a length of second portion 44 can be pre-determined to allow for depth-control or axial extension control of flexible guide tube 28 as flexible guide tube 28 is inserted into the gas turbine engine. Tip 46 guides an exit direction of tool 50 as tool 50 protrudes out of flexible guide tube 28. The angled shape of tip 46 allows tip 46 to glide along various surfaces inside an engine while being pushed into and through an inspection port.

During operation, tool 50 is used to capture images or video of areas of interest. In other examples, tool 50 may also be used to measure other electrical signals from sensor 56 (e.g., in the case where sensor 56 is an ultra-sonic sensor or an eddy-current sensor). In this example, tool 50 is used to inspect an area or areas of interest within a gas turbine engine. Body 52 supports distal end 54 with sensor 56 as well as provides a housing for any electrical circuitry and wires necessary for tool 50. Sensor 56 senses imagery of the area of interest being inspected by tool 50.

As will be discussed with respect to FIGS. 2-6, the combination of rigid guide tube 10, flexible guide tube 28, and tool 50 enables inspection within confined spaces with complex pathways. In particular, a staged insertion of rigid guide tube 10 into a borescope inspection port, then insertion of tool 50 into flexible guide tube 28, and then insertion of flexible guide tube 28 with tool 50 into rigid guide tube 10 enables manipulation of flexible guide tube 28 past interior components of the engine to deliver sensor 56 to a specific area of interest that is otherwise inaccessible with other inspection means. Additionally, the staged insertion of rigid guide tube 10 into a borescope inspection port, insertion of flexible guide tube 28 into rigid guide tube 10 while manipulating the flexible guide tube 28 past interior components of the engine based on the demarcations on the flexible guide tube 28, and insertion of tool 50 into the flexible guide tube 28 enables delivery of sensor 56 to a specific area of interest. Additionally, flexible guide tube 28 can be pre-shaped based of different configurations of the inspection area. For example, with respect to gas turbine engines, flexible guide tube 28 can be pre-shaped based on different engine geometries which allows the inspection methodology to be applicable for different engine models.

In existing tool assemblies, snake-arm robots with controllable segments that are used without guide tubes often include a cost penalty, a complexity penalty, and are difficult to use in the context of, for example, on-wing repair of an aircraft engine. Here, instead of making a snake-arm robot with many degrees of freedom to perform the tasks above, rigid guide tube 10, flexible guide tube 28, and tool 50 provide a manually operated device which looks and behaves similar to a tool with a controllable tip segment for various tasks while deploying tool 50 with the guide tube configuration(s) provided by rigid guide tube 10 and flexible guide tube 28.

Figure 2:
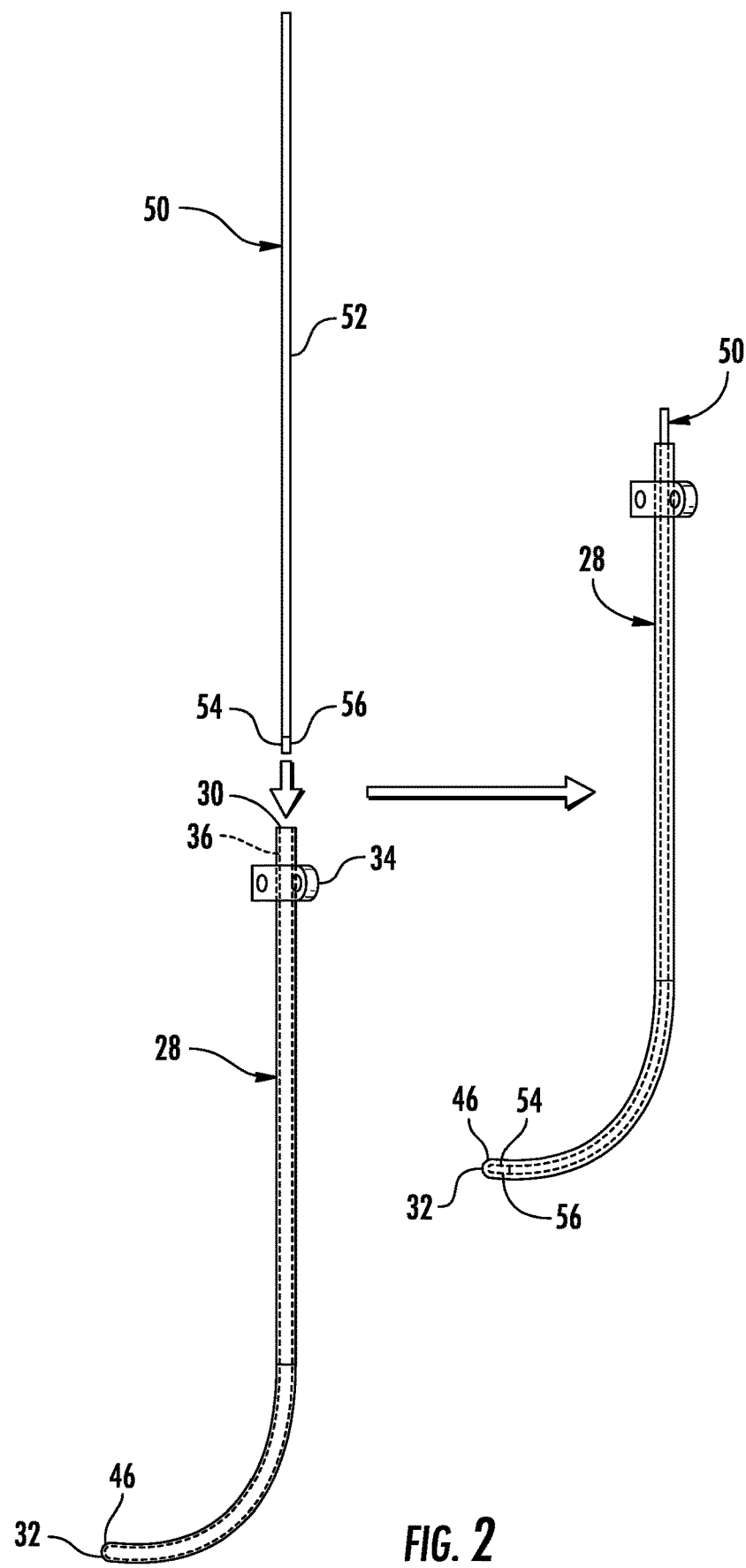
FIG. 2 is a side view of the borescope being inserted into the flexible guide tube.

FIG. 2 is a side view of tool 50 being inserted into flexible guide tube 28. More particularly, FIG. 2 shows flexible guide tube 28 (with inlet 30, outlet 32, wings 34, internal passage 36, and tip 46) and tool 50 (with body 52, distal end 54, and sensor 56).

In this example, tip 46 is shown as including a rounded shape. Here, tool 50 is shown on the left as being positioned in axial alignment with flexible guide tube 28. Distal end 54 of tool 50 is then inserted into internal passage 36 of flexible guide tube 28 via inlet 30. Once distal end 54 of tool 50 is inserted into internal passage 36 of flexible guide tube 28, tool 50 is pushed downward and through flexible guide tube 28. As tool 50 is pushed through flexible guide tube 28, tool 50 first passes through second portion 44 and then into first portion 42. As tool 50 enters into first portion 42, tool 50 begins to curve or bend as distal end 54 comes into contact with inner surface 40 along first portion 42. As distal end 54 comes into contact with inner surface 40 of internal passage 36, distal end 54 is guided along the curve of first portion 42 such that tool 50 is made to match the curved shape of first portion 42. As tool 50 is further pushed into flexible guide tube 28, distal end 54 continues to follow the curved shape of first portion 42 until distal end 54 reaches outlet 32 of flexible guide tube 28. At this stage, a user can maneuver distal end 54 of tool 50 by pushing or twisting body 52 so that distal end 54 can be fully housed within tip 46, partially housed within tip 46, or sticking out of tip 46 of flexible guide tube 28.

Due to the pre-formed and semi-rigid shape of flexible guide tube 28, first portion 42 of flexible guide tube 28 guides tool 50 along the curved shape of first portion 42 without having first portion 42 deforming or losing its shape. Additionally, tool 50 is flexible enough so that tool 50 bends and curves to match the shape of flexible guide tube 28 without affecting the physical or operation integrity of tool 50. This shape-matching dynamic between tool 50 and flexible guide tube 28 enables the user to maneuver flexible guide tube 28 to control a position of tool 50 within an inspection area. Flexible guide tube 28 also provides protection of tool 50 as flexible guide tube 28 and tool 50 are maneuvered through an inspection zone. For example, flexible guide tube 28 can absorb any contact or force received from any solid components within the inspection area that may otherwise damage or alter sensor 56 or tool 50.

Figure 3:
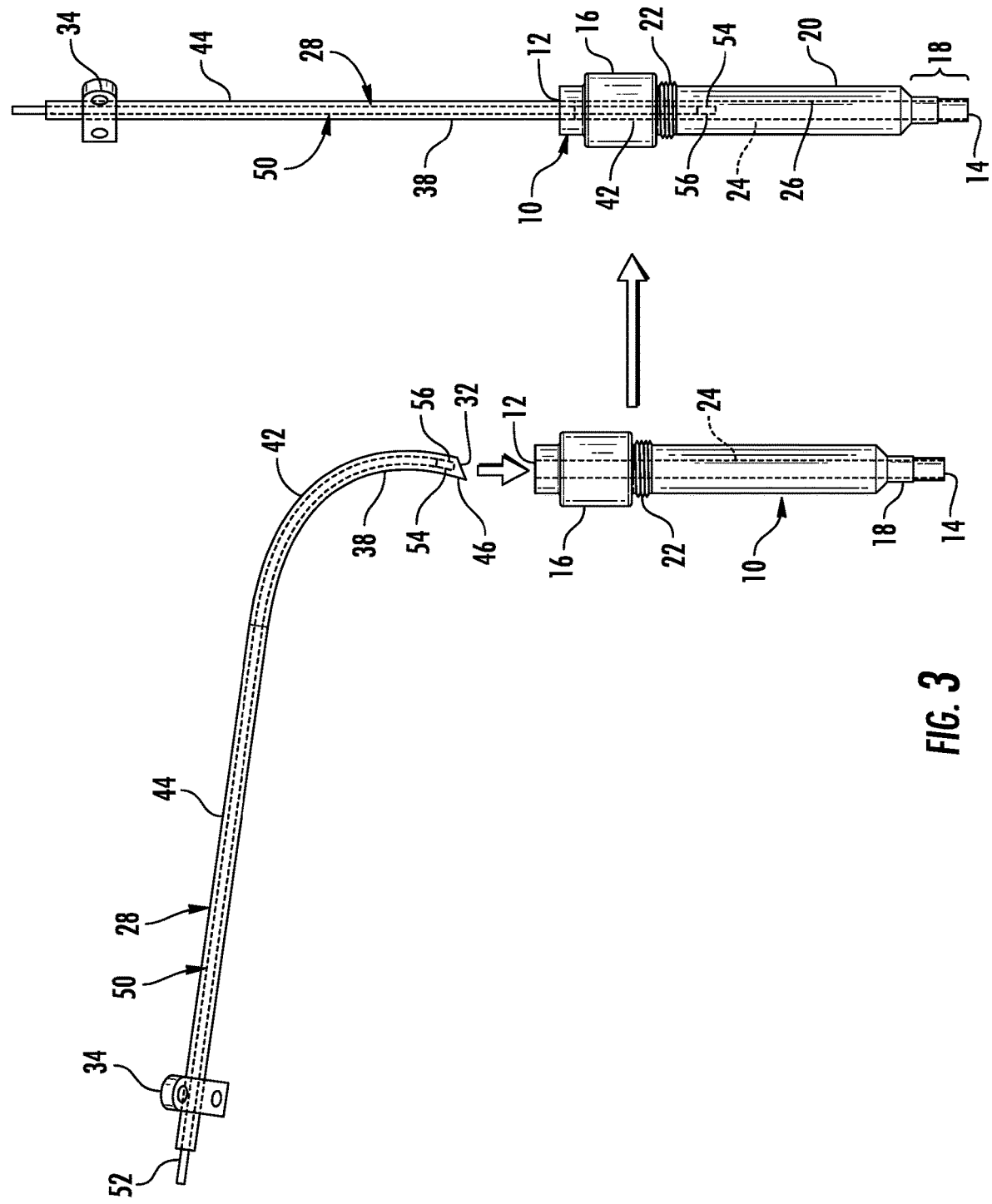
FIG. 3 is a side view of a series of steps involving inserting the flexible guide tube with the borescope into the rigid guide tube.

Once tool 50 is positioned in flexible guide tube 28, the steps presented in FIG. 3 of this disclosure can be executed.

FIG. 3 is a side view of a series of steps involving inserting flexible guide tube 28 with tool 50 into rigid guide tube 10 and shows rigid guide tube 10 (with inlet 12, outlet 14, collar 16, tip 18, outer surface 20, threaded portion 22, central cavity 24, and inner surface 26), flexible guide tube 28 (with outlet 32, wings 34, outer surface 38, first portion 42, second portion 44, and tip 46), and tool 50 (with body 52, distal end 54, and sensor 56).

Here, rigid guide tube 10 is shown in isolation. In other examples, rigid guide tube 10 can be inserted and engaged with an inspection portion of a gas turbine engine before flexible guide tube 28 is inserted into rigid guide tube 10. Before flexible guide tube 28 is inserted into rigid guide tube 10, tip 46 of flexible guide tube 28 is positioned near and in alignment with inlet 12 along an axial direction of rigid guide tube 10. Tip 46 of flexible guide tube 28 is then inserted into inlet 12 of rigid guide tube 10. Because distal end 54 of tool 50 is positioned in tip 46 of flexible guide tube 28, distal end 54 of tool 50 is also inserted into central cavity 24 of rigid guide tube as tip 46 of flexible guide tube 28 is inserted into inlet 12.

As flexible guide tube 28 inserts into rigid guide tube 10, a tubular shape of central cavity 24 of rigid guide tube 10 guides first portion 42 of flexible guide tube 28 into a straightened shape. For example, the curved shape of first portion 42 is straightened as outer surface 38 of flexible guide tube 28 comes into contact with inner surface 26 of central cavity 24. As all of first portion 42 is inserted into central cavity 24, both of flexible guide tube 28 and tool 50 are deformed to come into approximate axial alignment with central cavity 24 of rigid guide tube 10.

Here, the flexible and semi-rigid material of flexible guide tube 28 enables first portion 42 of flexible guide tube 28 to straighten thereby allowing tool 50 to pass into and through flexible guide tube 28.

Figure 4:
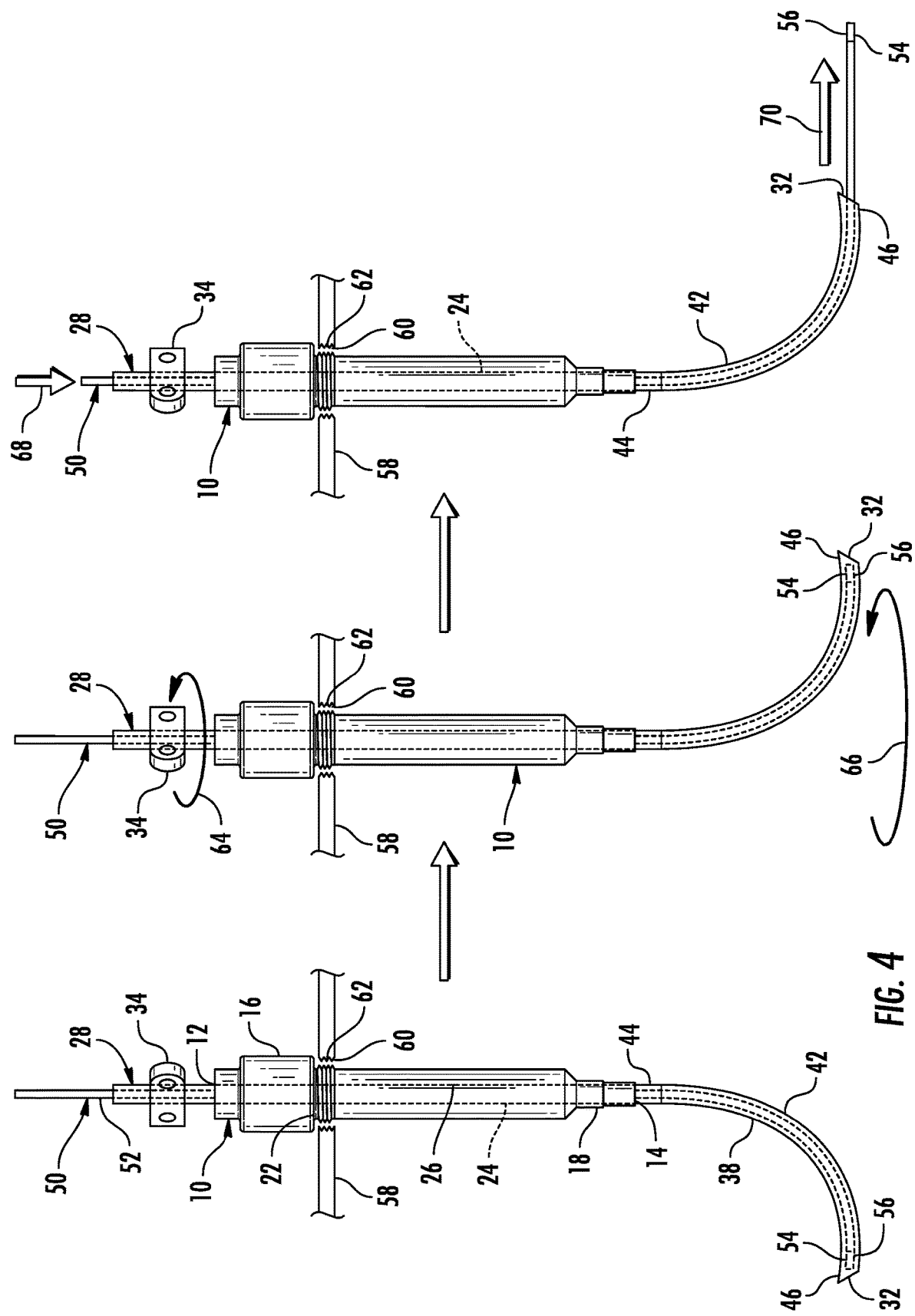
FIG. 4 is a side view of a series of steps involving positioning the flexible guide tube and the borescope.

FIG. 4 is a side view of a series of steps involving twisting flexible guide tube 28 relative to rigid guide tube 10 and extending tool 50 from flexible guide tube 28. FIG. 4 shows rigid guide tube 10 (with inlet 12, outlet 14, collar 16, tip 18, threaded portion 22, and central cavity 24), flexible guide tube 28 (with outlet 32, wings 34, outer surface 38, first portion 42, second portion 44, and tip 46), and tool 50 (with body 52, distal end 54, and sensor 56). FIG. 4 also shows a shroud 58 (with a port 60 and a threading 62), a rotation 64, a rotation 66, a translation 68, and a translation 70.

Shroud 58 is a casing or wall of a gas turbine engine. In one example, shroud 58 can be an outer shroud or casing of a gas turbine engine. Port 60 is an opening or hole. Threading 62 is a plurality of spirally bolt threads. Rotation 64 and rotation 66 are visual representations of a rotation of flexible guide tube 28. In particular, rotation 64 represents a rotation of second portion 44 of flexible guide tube 28 and rotation 66 represents a rotation of first portion 42 of flexible guide tube 28. Translation 68 and translation 70 represent linear movements of tool 50. In particular, translation 68 represents a downward motion of body 52 (top to bottom as shown in FIG. 4). Translation 70 represents a horizontal (left to right as shown in FIG. 4) motion of distal end 54 of tool 50.

Here in FIG. 4, rigid guide tube 10 is shown as being engaged with shroud 58. For example, threaded portion 22 of rigid guide tube 10 is threadably engaged with shroud 58. As can be seen in FIG. 4, as flexible guide tube 28 is rotated, tool 50 that is positioned within flexible guide tube 28 rotates or twists along with flexible guide tube 28. In this example, sensor 56 of tool 50 is positioned within tip 46 of flexible guide tube 28 as flexible guide tube 28 is rotated.

In another example, sensor 56 of tool 50 can be positioned partially or fully out of tip 46 of tool 50 before or as flexible guide tube 28 is rotated. In this example, flexible guide tube 28 is twisted in response to a torsional force is applied to wings 34 or to second portion 44 of flexible guide tube 28. In this way, by keeping distal end 54 of tool 50 inside of (e.g., centimeter(s) from the distal end) flexible guide tube 28 allows navigation of the combination of flexible guide tube 28 and tool 50 inside of a constrained space of a gas turbine engine. In the right-most portion of FIG. 4, tool 50 is pushed downward and through flexible guide tube 28 such that distal end 54 of tool 50 moves out of and away from an end (e.g., tip 46) of flexible guide tube 28. In one example, tool 50 is pushed out of flexible guide tube 28 until distal end 54 of tool 50 reaches an area of interest of a gas turbine engine.

Figure 5:
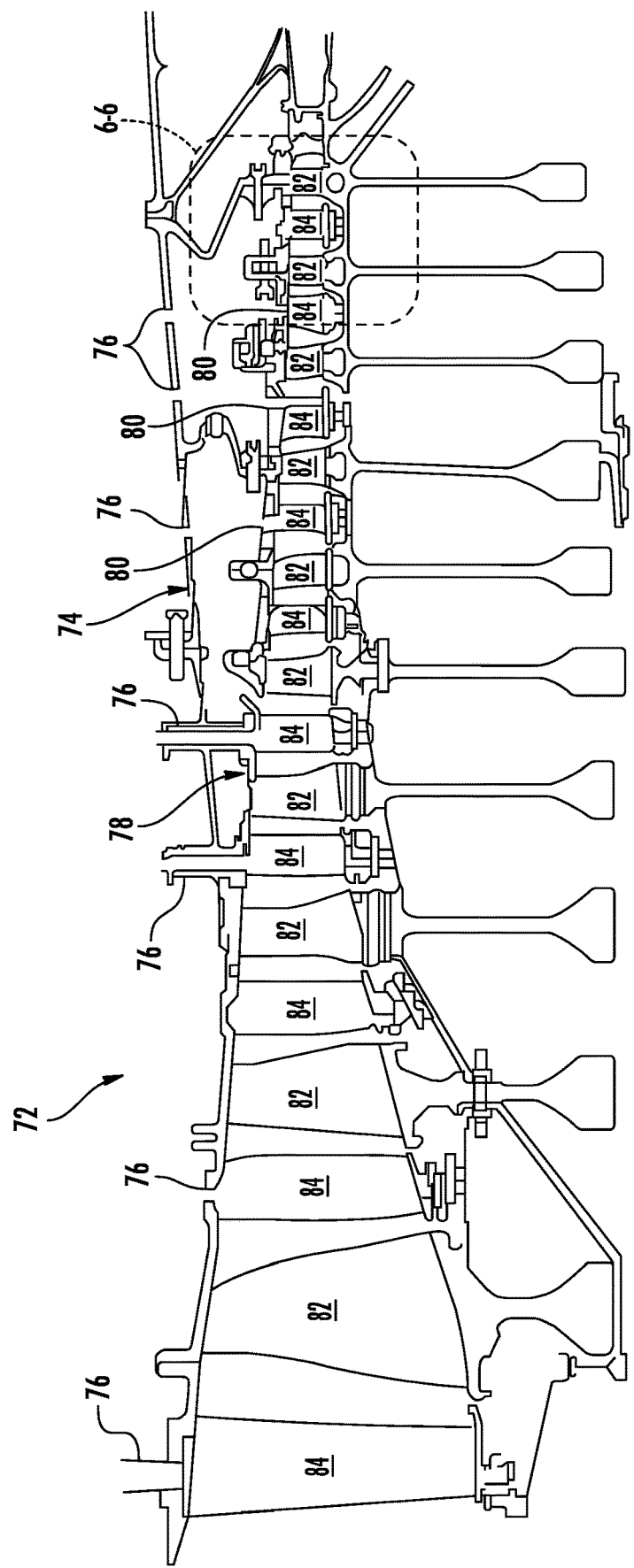
FIG. 5 is a cross-section view of a partial gas turbine engine

FIG. 5 is a cross-section view of a portion of a gas turbine engine 72 and shows an outer shroud 74 (with inspection ports 76), an inner shroud 78 (with inspection ports 80), rotor stages 82, and stator stages 84. FIG. 5 also shows an area 6-6 corresponding to elements shown in FIG. 6 of this disclosure.

Gas turbine engine 72 may be a ducted turbofan engine. In this example, a portion of a compressor section of gas turbine engine 72 is shown. It will be appreciated, however, that the exemplary gas turbine engine 72 depicted in FIG. 5 is by way of example only, and that in other exemplary embodiments, gas turbine engine 72 may have any other suitable configuration. For example, in other exemplary embodiments, the gas turbine engine may be a turboshaft engine, a turboprop engine, turbojet engine, etc.

Outer shroud 74 and inner shroud 78 are casings or walls of gas turbine engine 72. Inspection ports 76 and 80 are internal holes, openings, or orifices. In this example, inspection ports 76 and 80 are borescope inspection ports configured to receive a borescope inspection tool (see e.g., FIG. 1-4, rigid guide tube 10). In this example, one or more of inspection ports 76 can correspond to port 60 shown in FIG. 4. Rotor stages 82 are rows of rotating airfoil blades. In this example, each of rotor stages 82 include a plurality of circumferentially spaced blades. Stator stages 84 are rows of stationary stator vanes. In this example, each of stator stages 84 include a plurality of circumferentially spaced vanes.

Outer shroud 74 is disposed to form a radially outward surface of gas turbine engine 72. Inspection ports 76 are disposed in and along outer shroud 74. In this example, inspection ports 76 extend in a radial direction through outer shroud 74. Inner shroud 78 is disposed radially inward from outer shroud 74. Inspection ports 80 are disposed as an inner hole in inner shroud 78. In this example, inspection ports 80 extend in a radial direction through inner shroud 78. Rotor stages 82 and stator stages 84 are disposed in an alternating arrangement along an axial direction of gas turbine engine 72. Each of stator stages 84 are disposed axially adjacent to and downstream from a corresponding rotor stage 82. As shown in FIG. 5, a downstream direction is from left-to-right in the figures.

Outer shroud 74 and inner shroud 78 provide structural support to components of gas turbine engine 72 such as stator stages 84. Inspection ports 76 and 80 provide access points through which inspection tools can be inserted to visually inspect portions of gas turbine engine 72. Rotor stages 82 rotate about a central axis of gas turbine engine 72 in response to a torque in a shaft (e.g., from a turbine section of gas turbine engine 72) and cause a flow of air through gas turbine engine 72. Stator stages 84 guide and direct a flow of air passing across stator stages 84.

As will be discussed further with respect to FIG. 6, inspection ports 76 and 80 can be used for visual inspection tool access to portions of gas turbine engine 72 without line-of-sight access from inspection ports 76. For example, flexible guide tube 28 used in combination with rigid guide tube 10 can deliver tool 50 to portions of gas turbine engine 72 that are out of radial alignment with inspection ports 80.

Figure 6:
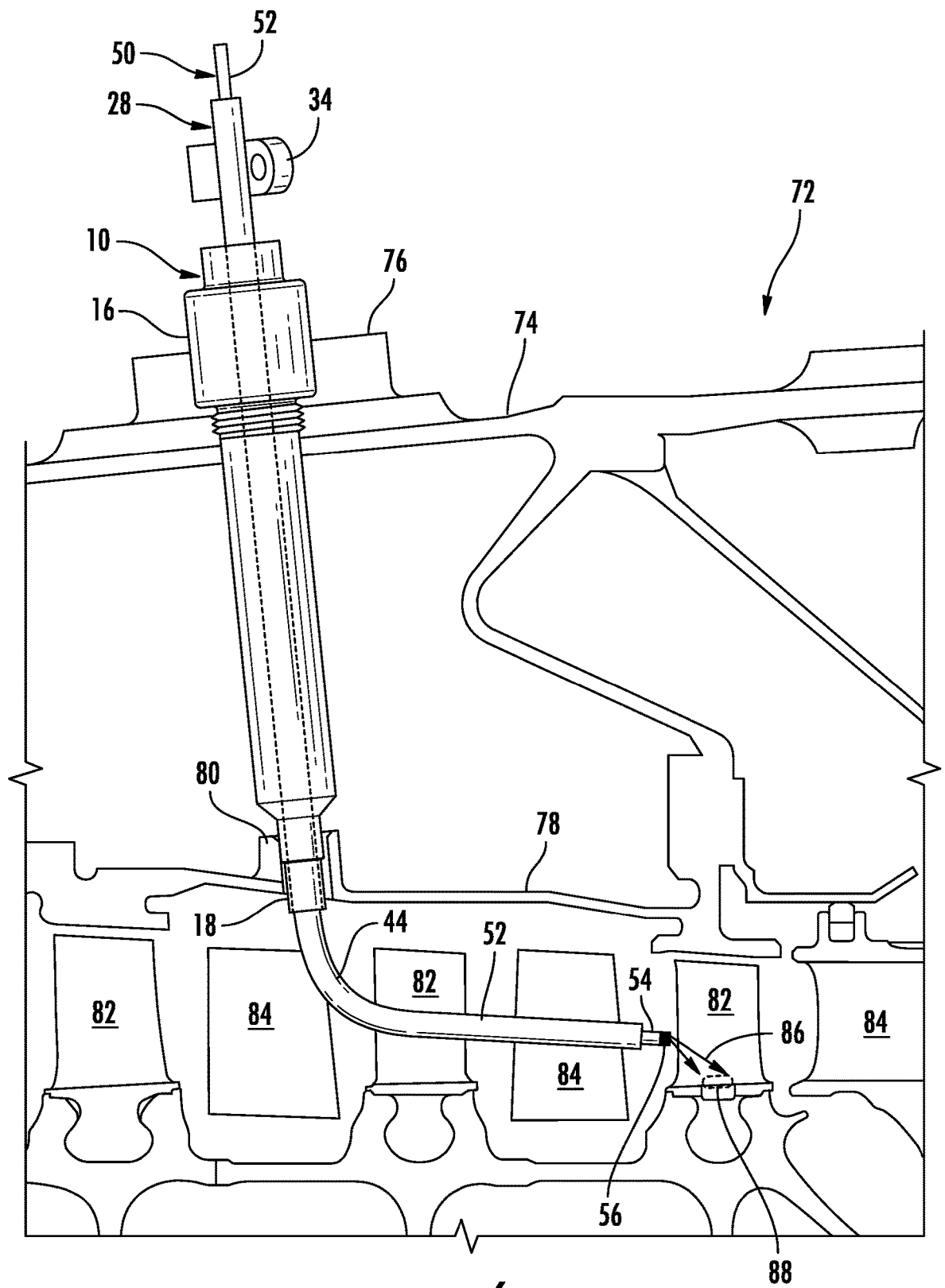
FIG. 6 is a cross-section view of area 6-6 identified in FIG. 5 of the gas turbine engine and shows a borescope insertion tool inserted into a portion of the gas turbine engine.

FIG. 6 is a cross-section view of area 6-6 identified in FIG. 5 of gas turbine engine 72 and shows rigid guide tube 10 (with collar 16 and tip 18), flexible guide tube 28 (with wings 34, first portion 42, and tip 46), tool 50 (with body 52, distal end 54, sensor 56, and a zone 86), gas turbine engine 72 (with outer shroud 74, inspection port 76, inner shroud 78, inspection port 80, rotor stages 82, stator stages 84, and an area of interest 88).

In this example, area 6-6 can include a portion of a high pressure compressor section of gas turbine engine 72. Additionally, inspection port 76 can correspond to an S8 borescope inspection port in the high pressure compressor section of gas turbine engine 72. In other examples, area 6-6 can be a portion of a booster section, a low pressure compressor section, a high pressure turbine section, or a low pressure turbine section of gas turbine engine 72. Zone 86 is a cone of visibility or field-of-view of sensor 56 of tool 50. In this example, sensor 56 may have less than a 360° field of view. In other examples, sensor 56 can have a 360° field-of-view such that zone 86 extends 360° around distal end 54 of tool 50.

Area of interest 88 is a specific region or component of gas turbine engine that is subject of inspection by a user or mechanic. In this example, area of interest 88 can include a nut or bolt such as a locking lug of rotor stage 82. In other examples, area of interest 88 can include other fasteners or physical features in any of an inlet section, a booster section, a compressor section, a combustor section, a turbine section, or an exhaust section of gas turbine engine 72. In this example, area of interest 88 is not disposed along a line-of-sight from inspection port 76 disposed in outer shroud 74 of gas turbine engine 72. Here, a line-of-sight from inspection port 76 includes any portion within gas turbine engine 72 that a user could see from the viewpoint provided at inspection port 76. Because area of interest 88 is blocked from view from inspection port 76 by inner shroud 78, area of interest 88 is not disposed along a line-of-sight from inspection port 76.

Here, FIG. 6 shows an installed or in-situ view of rigid guide tube 10 being installed or mounted into gas turbine engine 72. For example, rigid guide tube 10 is inserted into and extends through inspection port 76 such that tip 18 of rigid guide tube extends down to and is inserted into inspection port 80 of inner shroud 78. As discussed above, the reduced diameter of tip 18 allows tip 18 to be seated within inspection port 80 of inner shroud 78 thereby providing a mechanical stop for rigid guide tube 10.

With curved first portion 42 of flexible guide tube 28 protruding out of rigid guide tube 10, the curve of first portion 42 guides a direction of tool 50 to allow tool 50 to protrude out of flexible guide tube 28 towards area of interest 88. As distal end 54 of tool 50 is traversing or passing through and across various rows of rotor stages 82 and stator stages 84 of gas turbine engine 72, sensor 56 can be turned off or on. In the example with sensor 56 turned on, a user can use visual feedback provided by sensor 56 to visually verify the positioning of distal end 54 of tool 50 as distal end 54 is moved through gas turbine engine 72. In another example, the relative positioning between any of rigid guide tube 10, flexible guide tube 28, and tool 50 can also be used to determine the angular and axial positioning of distal end 54 of tool 50. For example, an angular position of flexible guide tube 28 relative to rigid guide tube 10 can be determined by an angular position of wings 34. Likewise, rigid guide tube 10 can be engaged with inner shroud 78 in such a way as to match a predetermined alignment between rigid guide tube 10 and inner shroud 78.

Once distal end 54 is positioned near area of interest 88, area of interest 88 can be inspected by sensor 56. After area of interest 88 is inspected by tool 50, tool 50 can be drawn back into flexible guide tube 28 and flexible guide tube 28 can be drawn back out of rigid guide tube 10. Then, rigid guide tube 10 can be disengaged with and from both of inner shroud 78 and outer shroud 74 and be fully removed from gas turbine engine 72.

Figure 7:
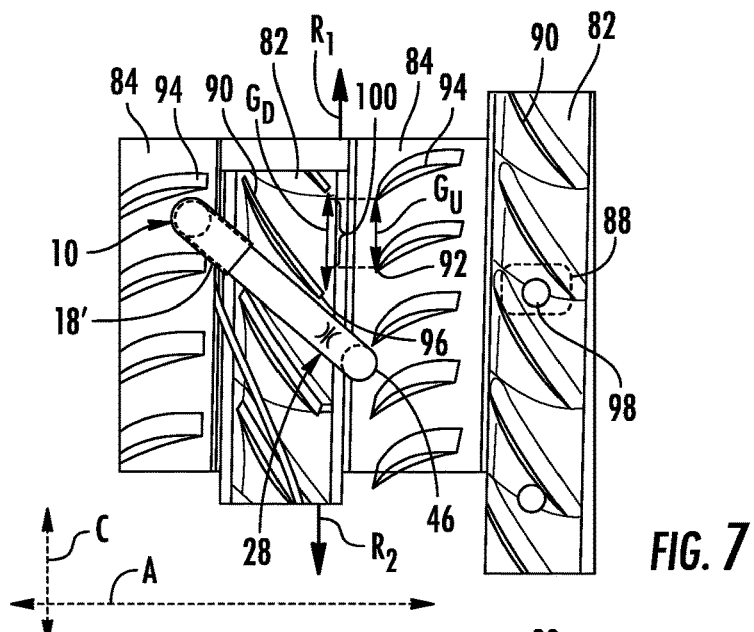
FIG. 7 is a top view of a series of stator and rotor stages with the borescope inspection tool with the flexible guide tube occupying a first position.

FIG. 7 is a top view of rotor stages 82 and stator stages 84 with rigid guide tube 10 and flexible guide tube 28 occupying a first position amongst rotor stages 82 and stator stages 84. FIG. 7 shows rigid guide tube 10 (with tip 18'), flexible guide tube 28 (with first portion 42 and tip 46), rotor stages 82 (with blades 90 including leading edges 92), stator stages 84 (with vanes 94 including trailing edges 96), area of interest 88, a fastener 98, and an overlap 100. FIG. 7 also shows a first direction $R_1$, a second direction $R_2$, an upstream gap $G_U$, and a downstream gap $G_D$. FIG. 7 also includes depictions of axial direction A and circumferential direction C.

Blades 90 and vanes 94 are airfoils configured to direct a flow of air. Leading edges 92 are upstream edges of vanes 94. Trailing edges 96 are downstream edges of blades 90. Fastener 98 is a mechanical device for attaching or mounting two or more components together. In this example, fastener 98 can be a locking lug of one of rotor stages 82. In other examples, fastener 98 can be a locking lug of any of rotors stages 82 or stator stages 84.

Figure 8:
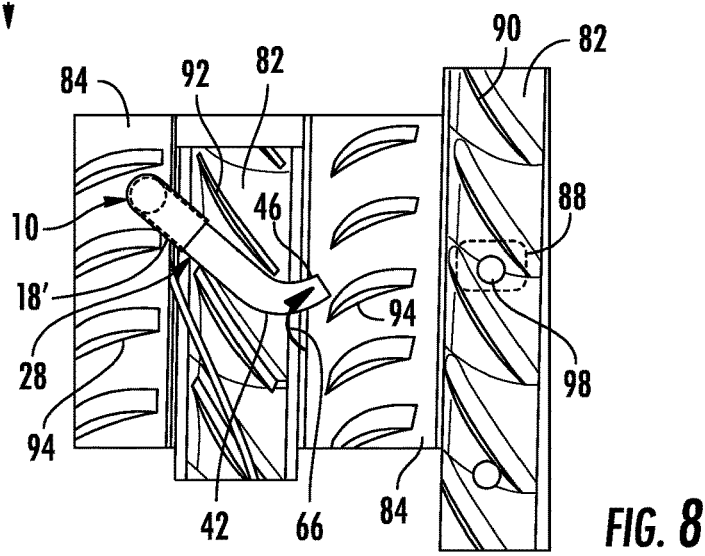
FIG. 8 is a top view of a series of stator and rotor stages with the borescope inspection tool with the flexible guide tube twisted into a second position.
Figure 9:
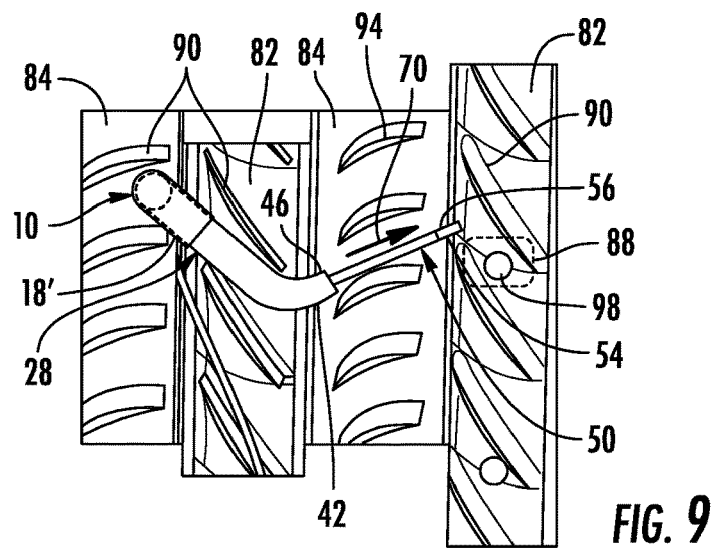
FIG. 9 is a top view of a series of stator and rotor stages with the borescope inspection tool with the borescope extended towards a locking nut.

First direction $R_1$ is a direction of circumferential rotation of rotor stages 82. In FIG. 7, first direction $R_1$ is shown as pointing in an upward direction. Second direction $R_2$ is another direction of circumferential rotation of rotor stages 82 that is opposite from first direction $R_1$. In FIG. 7, second direction $R_2$ is shown as pointing in a downward direction. Upstream gap $G_U$ is a space defined between leading edges 92 of circumferentially adjacent vanes 94. For example, upstream gap $G_U$ is positioned at an upstream end (e.g., leading edges 92) of vanes 94. Downstream gap $G_D$ is a space defined between trailing edges 96 of circumferentially adjacent blades 90. For example, downstream gap $G_D$ is positioned at a downstream end (e.g., trailing edges 96) of blades 90. Overlap 100 is an amount or area of overlap along an axial direction (left to right as shown in FIGS. 7-9) between upstream gap $G_U$ and downstream gap $G_D$.

Rigid guide tube 10 and flexible guide tube 28 are shown as positioned in spaces between adjacent blades 90 and vanes 94. In FIGS. 7-9, rigid guide tube is oriented such that an axial direction of rigid guide tube 10 extends in to and out of the page. In this example, rigid guide tube 10 includes tip 18' that includes an approximate 90° curve (see e.g., FIG. 1). With flexible guide tube 28 being positioned in and extending out of rigid guide tube 10, tip 18' has guided flexible guide tube 28 along the curve of tip 18' such that flexible guide tube 28 extends out of tip 18' in a direction that is approximately perpendicular from the axial direction of rigid guide tube 10, which in FIGS. 7-9 is shown as in to and out of the page. In this way, flexible guide tube 28 occupies an initial position in FIG. 7 such that flexible guide tube 28 is curved along tip 18'. In this initial position, first portion 42 and tip 46 of flexible guide tube 28 bend upward (and out of the page as shown in FIG. 7).

Blades 90 are mounted to and formed with rotor stages 82. Here, each of rotor stages 82 are shown as including a plurality of circumferentially spaced blades 90. Likewise, stator stages 84 are shown as including a plurality of circumferentially spaced vanes 94. Leading edges 92 of vanes 94 are disposed downstream from axially adjacent trailing edges 96 of blades 90. Vanes 94 are mounted to and formed with stator stages 84. In this example, rotor stages 82 are disposed to rotate about an axial centerline of gas turbine engine 72 (see e.g., FIG. 6) and relative to stator stages 84. In this example, fastener 98 is disposed along one of rotor stages 82. In other examples, fastener 98 and/or area of interest 88 can be positioned along other portions of gas turbine engine 72 such as along one of stator stages 84, inner shroud (see FIG. 6), or other locations within gas turbine engine 72.

During operation of gas turbine engine 72, rotors stages 82 with blades 90 are rotated at high velocities with respect to stator stages 84 with vanes 94. Blades 90 push and direct air in downstream direction (left to right as shown in FIGS. 7-9) while vanes 94 redirect and straighten a flow of air. During inspection, while gas turbine engine 72 is shutdown, rotor stages 82 can be adjusted (e.g., rotated) relative to stator stages 84 (and/or gas turbine engine 72 generally) to create a large enough path for flexible guide tube 28 to fit through so that flexible guide tube 28 can move between and be extended across adjacent rows of rotor stages 82 and stator stages 84.

For example, before inserting rigid guide tube 10 into inspection ports 76 and 80 or before flexible guide tube 28 is inserted into rigid guide tube 10, one or more rotor stages 82 of gas turbine engine 72 can be adjusted. The one or more rotor stages 82 of gas turbine engine 72 can be adjusted such that blades 90 of rotor stages 82 are positioned in a predetermined location with respect to vanes 94 of stator stages 84 of gas turbine engine 72. For example, the one or more rotor stages 82 of gas turbine engine 72 can be adjusted such that blades 90 of rotor stages 82 can be aligned in an axial direction (from left to right as shown in FIGS. 6-9) with vanes 94 of stator stages 84 of gas turbine engine 72. As shown in FIG. 7, rotor stages 82 can be rotated in a first direction $R_1$ and/or in a second direction $R_2$.

In another example, an upstream gap can be defined between leading edges of circumferentially adjacent blades 90 of one of rotor stages 82. A downstream gap can be defined between trailing edges of circumferentially adjacent vanes 94 of one of stator stages 84. To bring blades 90 into axial alignment with vanes 94, one or more of rotor stages 82 can be rotated such that an upstream gap between leading edges of circumferentially adjacent blades 90 partially overlaps a downstream gap between trailing edges of circumferentially adjacent vanes 94 in an axial direction (left to right as shown in FIGS. 6-9) of gas turbine engine 72. In one example, an amount of overlap can extend a length at least as large as a diameter of flexible guide tube 28.

In one example, inserting flexible guide tube 28 with tool 50 into rigid guide tube 10 can include at least one of pushing or twisting flexible guide tube 28 until distal end 54 of flexible guide tube 28 is positioned axially past at least one of rotor stages 82 or stator stages 84. Once flexible guide tube 28 is disposed in a desired axial and radial position, flexible guide tube 28 can be twisted to adjust a position of tip 46 of flexible guide tube 28 in order to deliver distal end 54 of tool 50 to area of interest 88.

FIG. 8 is a top view of rotor stages 82 and stator stages 84 with flexible guide tube 28 shown as occupying a second position. FIG. 8 shows rigid guide tube 10, flexible guide tube 28 (with first portion 42 and tip 46), rotor stages 82 (with blades 90), stator stages 84 (with vanes 94), area of interest 88, and fastener 98. FIG. 8 also includes depictions of axial direction A and circumferential direction C.

Here, flexible guide tube is shown in a second rotated position. For example, rotation 66 is applied to flexible guide tube 28 to change the position of tip 46 of flexible guide tube 28. From the initial position of flexible guide tube 28 shown in FIG. 7, in which first portion 42 and tip 46 were positioned in an upwards position (out of the page as shown in FIG. 7), rotation 66 of flexible guide tube 28 rotates tip 46 from an upwards position to a position where tip 46 is pointing along and across one of stator stages 84. As can be seen in FIG. 8, tip 46 of flexible guide tube 28 is now aligned such that tip 46 is pointed at or in the general direction of area of interest 88. As part of or in addition to this step, one or more of rotor stages 82 can be further rotated to adjust the axial alignment of blades 90 and vanes 94 to provide enough clearance for flexible guide tube 28 and/or tool 50 so that tool 50 can be extended towards area of interest 88.

FIG. 9 is a top view of rotor stages 82 and stator stages 84 with tool 50 extending out of flexible guide tube 28. FIG. 9 shows rigid guide tube 10, flexible guide tube 28 (with first portion 42 and tip 46), tool 50 (with distal end 54 and sensor 56), rotor stages 82 (with blades 90), stator stages 84 (with vanes 94), area of interest 88, and fastener 98. FIG. 9 also includes depictions of axial direction A and circumferential direction C.

Here, tool 50 is shown as moved out of and away from tip 46 of flexible guide tube 28. For example, an end of tool 50 sticking out of the end of flexible guide tube opposite of tip 46 can be pushed down into flexible guide tube 28 to cause distal end 54 of tool 50 to move away from tip 46 of flexible guide tube 28 and towards area of interest 88. In this example, tool 50 can be pushed through flexible guide tube 28 until distal end 54 of tool 50 reaches area of interest 88. Here, inspecting area of interest 88 includes positioning distal end 54 of tool 50 within line-of-sight of area of interest 88. In this example, within a line-of-sight of area of interest can mean that there are no physical objects or components blocking a sight line extending between distal end 54 and area of interest 88.

As can be seen in FIGS. 7-9, rotor stages 82 have been rotated to allow flexible guide tube 28 and tool 50 sufficient gaps and space(s) so that distal end 54 of tool 50 has a clear path as distal end 54 of tool 50 moves linearly towards area of interest 88. In other examples, flexible guide tube 28 and/or tool 50 can come into contact with any of blades 90 or vanes 94 in order for one of blades 90 or vanes 94 to deflect and re-direct flexible guide tube 28 or tool 50 along an intended direction and to deliver distal end 54 of tool 50 to area of interest 88.

Once distal end 54 of tool 50 is positioned near or at area of interest 88, sensor 56 can be operated to capture imagery of area of interest and of fastener 98. For example, inspection of fastener 98 can determine an amount of protrusion of fastener 98 relative to a predetermined baseline position of fastener 98. The determined amount of protrusion of fastener 98 can then be observed by a user to be used to make subsequent decisions. In other examples, area of interest 88 can be examined with sensor 56 to detect other states of interest such as wear, damage, debris, or lack thereof.

After area of interest has been inspected and/or examined by tool 50, tool 50 can be drawn backing into flexible guide tube 28 and flexible guide tube 28 can be drawn out of rigid guide tube 10. In another example, tool 50 can be withdrawn completely from flexible guide tube 28 before flexible guide tube 28 is withdrawn from rigid guide tube 10. In yet another example, tool 50 can be completely withdrawn from flexible guide tube 28 and then rigid guide tube 10 (with flexible guide tube 28 inserted into rigid guide tube 10) can be withdrawn from inner shroud 78 and from outer shroud 74 of gas turbine engine 72.

The proposed method of navigating flexible guide tube 28 while keeping tool 50 inside flexible guide tube 28 provides for easy operation while providing support and safety for tool 50. Keeping sensor 56 of tool 50 inside flexible guide tube 28 (e.g., a few centimeters from an end of tip 46 of flexible guide tube 28) allows for easy navigation of the combination of flexible guide tube 28 and tool 50 inside the constrained space of gas turbine engine 72.

The use of rigid guide tube 10 and flexible guide tube 28 with tool 50 enables servicing (e.g., borescopic inspection) within confined spaces with complex pathways (e.g., the compressor, the combustion chamber, and/or the turbine in a gas turbine engine). Moreover, flexible guide tube 28 provides an inexpensive protection for the more expensive tool 50 while navigating inside gas turbine engine 72. Additionally, the use of flexible guide tube 28 to guide tool 50 through rotor and stator stages 82 and 84 helps reduce the risk of tool 50 damaging blades 90 or vanes 94. Moreover, rigid guide tube 10 with flexible guide tube 28 allows a user to conduct on-wing inspections in rotor stages 82 where direct access is not available by means of an inspection port (e.g., a borescope inspection port). What's more, the use of rigid guide tube 10 and flexible guide tube 28 with tool 50 reduces an amount of inspection time and a decreased maintenance burden. In addition, flexible guide tube 28 can be pre-shaped based on different engine geometries with such shapes allowing the inspection methodology to be applicable for different engine models.

Figure 10:
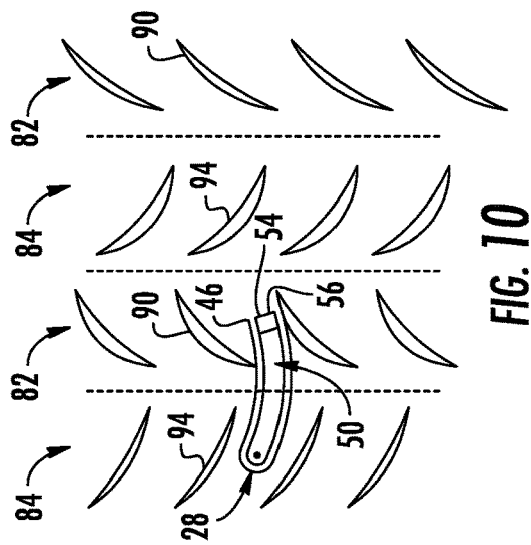
FIG. 10 is a top view of a series of stator and rotor stages with the flexible guide tube in a first position and the borescope in a first sheathed position.
Figure 11:
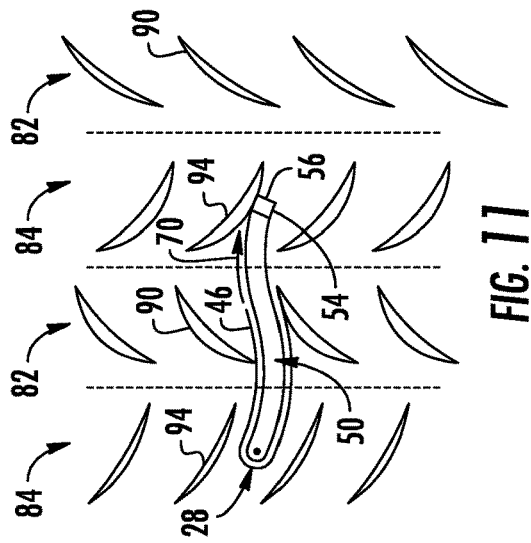
FIG. 11 is a top view of a series of stator and rotor stages with the flexible guide tube in the first position and the borescope in a second unsheathed position.
Figure 12:
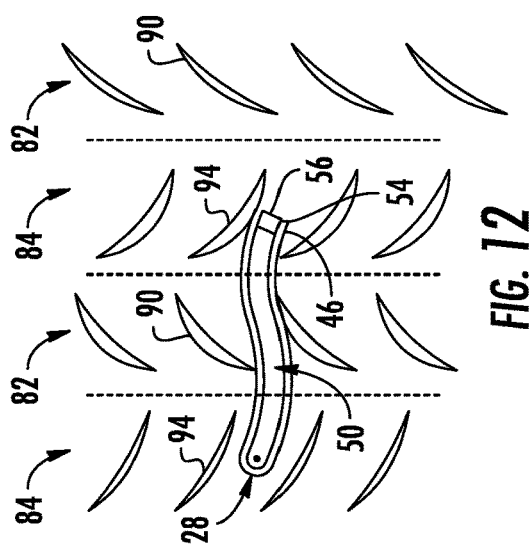
FIG. 12 is a top view of a series of stator and rotor stages with the flexible guide tube in a second extended position and the borescope in a third sheathed position.
Figure 13:
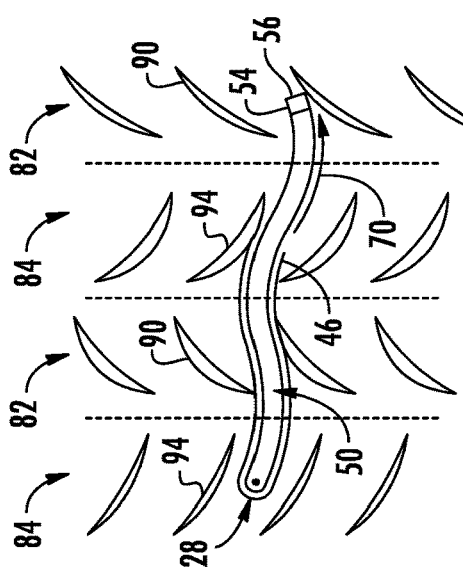
FIG. 13 is a top view of a series of stator and rotor stages with the flexible guide tube in the second extended position and the borescope in a fourth unsheathed position.
Figure 14:
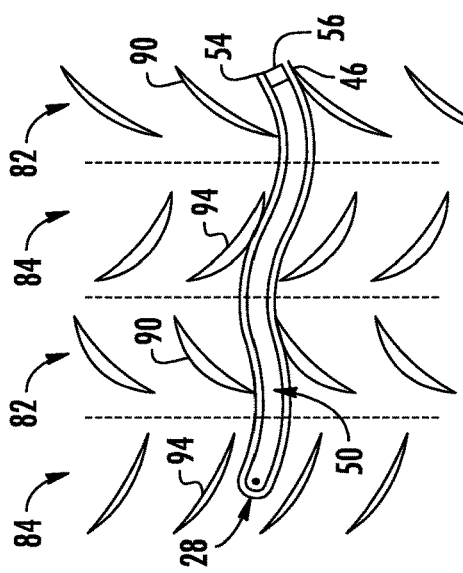
FIG. 14 is a top view of a series of stator and rotor stages with the flexible guide tube in a third position and the borescope in a fifth sheathed position.
Figure 15:
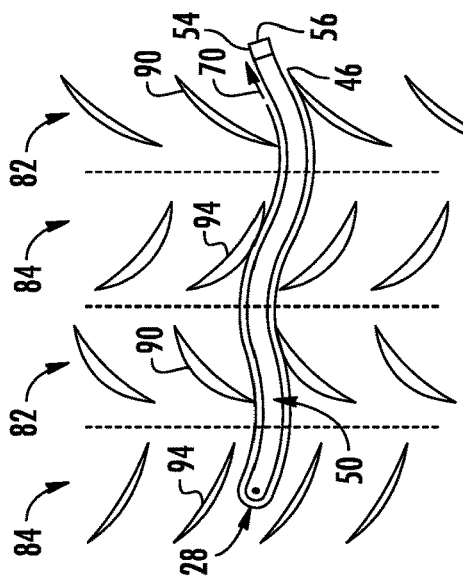
FIG. 15 is a top view of a series of stator and rotor stages with the flexible guide tube in the position and the borescope in a sixth unsheathed position.

FIG. 10 is a top view of rotor stages 82 and stator stages 84 with flexible guide tube 28 in a first position and tool 50 in a first sheathed position. FIG. 11 is a top view of rotor stages 82 and stator stages 84 with flexible guide tube 28 in the first position and tool 50 in a second unsheathed position. FIG. 12 is a top view of rotor stages 82 and stator stages 84 with flexible guide tube 28 in a second extended position and tool 50 in a third sheathed position. FIG. 13 is a top view of rotor stages 82 and stator stages 84 with flexible guide tube 28 in the second extended position and tool 50 in a fourth unsheathed position. FIG. 14 is a top view of rotor stages 82 and stator stages 84 with flexible guide tube 28 in a third position and tool 50 in a fifth sheathed position. FIG. 15 is a top view of rotor stages 82 and stator stages 84 with flexible guide tube 28 in the position and tool 50 in a sixth unsheathed position. FIGS. 10-15 show flexible guide tube 28 (with tip 46), tool 50 (with distal end 54 and sensor 56), translation 70 of tool 50, rotor stages 82 (with blades 90), and stator stages 84 (with vanes 94).

In FIG. 10, tool 50 is disposed within flexible guide tube 28 such that distal end 54 of tool 50 does not protrude out of tip 46 of flexible guide tube 28. Put another way, distal end 54 of tool 50 is completed nested within tip 46. As between FIGS. 10 and 11, tool 50 is shown with translation 70 (shown in FIG. 11) by moving relative to flexible guide tube 28. In FIG. 11, distal end 54 of tool 50 occupies a second un-sheathed position. Additionally, distal end 54 of tool 50 is shown as coming into contact with one of vanes 94 of stator stages 84. As distal end 54 of tool 50 comes into contact with one of vanes 94, tool 50 is deflected and redirected such that a pathway of distal end 54 of tool 50 is altered. In this way, vanes 94 (or blades 90) can be used to direct a direction of movement of tool 50 throughout and between rotor stages 82 and stator stages 84.

As between FIGS. 11 and 12, flexible guide tube 28 has been pushed to translate along tool 50 and to bring tip 46 of flexible guide tube 28 in line with, or past, distal end 54 of tool 50. As shown in FIG. 12, flexible guide tube 28 has translated to the point where distal end 54 of tool 50 is again entirely nested within tip 46 of flexible guide tube 28. In this example, tip 46 of flexible guide tube 28 can come into contact with one of vanes 94 as flexible guide tube 28 translates along tool 50. As between FIGS. 12 and 13, tool 50 performs translation 70 (shown in FIG. 13) to move into another un-sheathed position. Here, tool 50 is shown as extending across one of stator stages 84, across one of rotor stages 82, across another one of stator stages 84, and across another one of rotor stages 82. In the example shown in FIG. 13, distal end 54 of tool 50 can come into contact with one of blades 90. With respect to FIG. 14, flexible guide tube 28 has moved from its position in FIG. 13 to the position shown here, which includes having been translated along tool 50 such that distal end 54 of tool is again entirely nested within tip 46 of flexible guide tube 28. From FIG. 14 to FIG. 15, tool 50 is again translated relative to flexible guide tube 28 (e.g., translation 70 as shown in FIG. 15) such that distal end 54 of tool 50 protrudes out and away from tip 46 of flexible guide tube 28.

Here, FIGS. 10-15 present an embodiment where tool 50 itself acts as a guide to enable further deployment of flexible guide tube 28. For example, a length of a portion of tool 50 deployed beyond an end of flexible guide tube 28 acts as a guide around blades 90 or vanes 94 through which flexible guide tube 28 has passed. In this way, flexible guide tube 28 can be pushed forward along and back over tool 50. Then, tool 50 can be pushed further forward within flexible guide tube 28. In addition, a controllable tip of tool 50 can be used to steer distal end 54 of tool 50 around another corner or object (e.g., blade 90 or vane 94). Then, flexible guide tube 28 can be pushed forward again. These steps (or this process) can be repeated until distal end 54 of tool 50 reaches area of interest 88 (see e.g., FIGS. 6-9).

Figure 16:
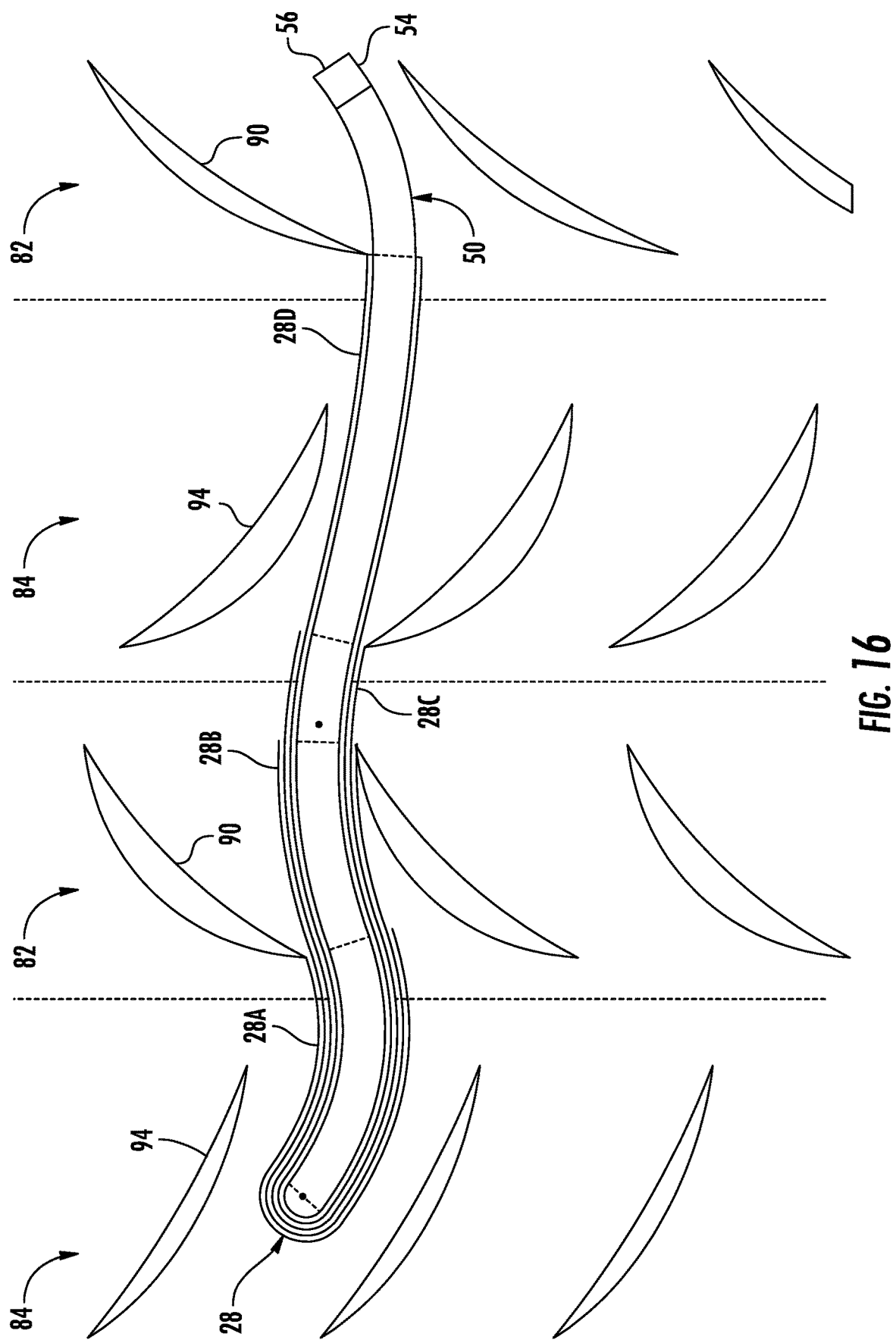
FIG. 16 is a top view of a series of stator and rotor stages with the borescope inspection tool including a plurality of flexible guide tubes.

FIG. 16 is a top view of a series of rotor stages 82 and stator stages 84 with a tool 50 being surrounded by plurality of flexible guide tubes 28 in accordance with another exemplary embodiment of the present disclosure. FIG. 16 shows first flexible guide tube 28A, second flexible guide tube 28B, third flexible guide tube 28C, fourth flexible guide tube 28D, tool 50 (with distal end 54 and sensor 56), rotor stages 82 (with blades 90), and stator stages 84 (with vanes 94).

As shown in FIG. 16, flexible guide tubes 28 include four separate flexible guide tubes 28—first flexible guide tube 28A, second flexible guide tube 28B, third flexible guide tube 28C, and fourth flexible guide tube 28D. In other examples, less than or more than four flexible guide tubes 28 can be utilized.

In this alternative embodiment, an n number (e.g., with "n" equaling 4 for the four flexible guide tubes 28 shown in FIG. 16) of flexible guide tubes 28 can be used in combination. All of flexible guide tubes 28 (e.g., first flexible guide tube 28A, second flexible guide tube 28B, third flexible guide tube 28C, and fourth flexible guide tube 28D) are disposed approximately co-axially. After insertion through rigid guide tube 10 (see e.g., FIGS. 1-9), all flexible guide tubes 28 and tool 50 start off at the same axial position (e.g., with the axial direction shown as left-to-right in FIG. 16).

Then, tool 50 itself is advanced out of flexible guide tubes 28 and is steered to define a short path section with a curved portion. As used herein, the term "steered" can refer to distal end 54 of tool being controlled by moving articulating segments of tool 50. Such segments can be manipulated along one or more axes to bend tool 50 along joints disposed between the segments.

Next, tool 50 is held in place (e.g., relative to rigid guide tube—not shown in FIG. 16) while the inner n−1 flexible guide tubes 28 are pushed forward relative to tube n (e.g., the outermost flexible guide tube 28, first flexible guide tube 28A as shown in FIG. 16) over and along tool 50. In this example, the inner n−1 flexible guide tubes 28 can be represented by second flexible guide tube 28B, third flexible guide tube 28C, and fourth flexible guide tube 28D. Then, tool 50 is advanced again, to define a next section of a movement path of tool 50. Next, the inner n−2 flexible guide tubes 28 are pushed forward over tool 50. Here, the term n−2 guide tubes can refer to third flexible guide tube 28C and fourth flexible guide tube 28D, with "n" equaling 4 for the four flexible guide tubes 28 shown in FIG. 16. This pattern can continue for as many flexible guide tubes 28 that are being used.

In this manner, a convoluted/serpentine path can be formed, without extensive sliding of flexible guide tubes 28 or of tool 50 relative to the edges of blades 90 and vanes 94. Through utilization of a plurality of flexible guide tubes 28, tool 50 can be protected against any sliding contact between tool 50 and an edge of any of blades 90 and/or vanes 94.

FIG. 16 illustrates an approach which is intended to overcome a potential risk of either flexible guide tube 28 or tool 50 snagging on any of blades 90 and vanes 94. The multi-tube configuration shown in FIG. 16 also provides for a large number of changes of direction thereby enabling navigation of tool 50 past across multiple rows of blades 90 and vanes 94.

With regard to removing tool 50, extraction of tool 50 can include either a reversal of the insertion process (e.g., stepped/sequential protrusion of flexible guide tubes 28) or by removing tool 50 before removing any of flexible guide tubes 28. Removing tool 50 before flexible guide tubes 28 provides the most protection of tool 50 which can often include a high-cost item (e.g., borescope). After tool 50 is removed from flexible guide tubes 28, the inner-most flexible guide tube 28 (e.g., fourth flexible guide tube 28D as shown in FIG. 16) can then be removed next after tool 50. After the inner-most flexible guide tube 28 is removed, the next inner-most flexible guide tube 28 (e.g., third flexible guide tube 28C as shown in FIG. 16) can be removed, and so on and so forth until all of flexible guide tubes 28 are removed from rigid guide tube 10 (not shown in FIG. 16).

In another embodiment, the order of removal of flexible guide tubes 28 can be reversed, such that the outer-most flexible guide tube 28 (e.g., first flexible guide tube 28A as shown in FIG. 16) can be removed first. In yet another embodiment, all of flexible guide tubes 28 can be extracted together at the same time.

Here, the use of multiple flexible guide tubes 28 can help to limit an amount of material debris cut from flexible guide tubes 28 if one of flexible guide tubes 28 were to get snagged on cut from being dragged across the edges of blades 90 and/or vanes 94. With multiple flexible guide tubes 28 being used, each flexible guide tube 28 only needs to slide a very short length over one edge and so even if a section of one of flexible guide tubes 28 did get snagged on one edge of blades 90 or vanes 94 with which flexible guide tubes 28 might be in contact, an amount of material lost from flexible guide tubes 28 would be minimal. In one example, a material of flexible guide tubes 28 can include a combustible, low-residue polymer to ensure no lasting effects from leaving a fraction of a small amount of material behind.

The process presented in FIG. 16 and described herein with respect to FIG. 16 provides a solution of sequentially controlling the amount of insertion of multiple flexible guide tubes 28 that can avoid risks flexible guide tube 28 becoming snagged on an edge of blades 90 or vanes 94 and being cut.

This written description uses examples to describe the disclosure, including the best mode, and also to enable any person skilled in the art to practice the disclosed embodiments, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method of servicing a portion of a gas turbine engine includes inserting a rigid guide tube into an inspection port in a shroud of the gas turbine engine. The flexible guide tube is inserted into and through the rigid guide tube. The flexible guide tube is pre-shaped such that the flexible guide tube is biased towards a predetermined shape after being inserted through the rigid guide tube. A tool is pushed through the flexible guide tube such that the distal end of the tool moves out of and away from an end of the flexible guide tube. An area of interest of the gas turbine engine is then serviced with the tool.

The method of one or more of these clauses, further comprising, before inserting the flexible guide tube into the rigid guide tube, inserting the tool into the flexible guide tube such that a distal end of the tool is positioned inside a portion of the flexible guide tube.

The method of one or more of these clauses, further comprising, before inserting the rigid guide tube into the inspection port, adjusting a rotor stage of the gas turbine engine such that rotor blades of the rotor stage are positioned in a predetermined location with respect to stator vanes of a stator stage of the gas turbine engine.

The method of one or more of these clauses, wherein inserting the flexible guide tube with the tool into the rigid guide tube comprises pushing the flexible guide tube, twisting the flexible guide tube, or both until the distal end of the flexible guide tube is positioned past one of the rotor stage, the stator stage, or both along an axial direction of the gas turbine engine.

The method of one or more of these clauses, wherein pushing or twisting the flexible guide tube comprises: contacting a rotor blade or a stator vane with a tip of the flexible guide tube; and sliding the flexible guide tube along the rotor blade or the stator vane as the flexible guide tube is being pushed or twisted.

The method of one or more of these clauses, wherein the area of interest of the gas turbine engine comprises a locking lug of one of the rotor stage or the stator stage.

The method of one or more of these clauses, further comprising determining an amount of protrusion of the locking lug relative to a baseline position of the locking lug.

The method of one or more of these clauses, further comprising: drawing the tool back into the flexible guide tube after the area of interest has been serviced; and drawing the flexible guide tube with the tool out of the rigid guide tube.

The method of one or more of these clauses, wherein the area of interest is not disposed along a line-of-sight from the inspection port disposed in the shroud of the gas turbine engine.

The method of one or more of these clauses, wherein pushing the tool through the flexible guide tube comprises pushing the tool until the distal end of the tool reaches the area of interest of the gas turbine engine.

The method of one or more of these clauses, wherein servicing the area of interest comprises positioning the distal end of the tool within a line-of-sight of the area of interest of the gas turbine engine.

The method of one or more of these clauses, wherein servicing the area of interest of the gas turbine engine comprises capturing imagery with an image sensor disposed on the distal end of the tool.

The method of one or more of these clauses, further comprising engaging the rigid guide tube with the inspection port such that the rigid guide tube connects to the inspection port.

The method of one or more of these clauses, wherein engaging the rigid guide tube with the inspection port further comprises connecting the rigid guide tube with an internal hole formed by an inner shroud of the gas turbine engine.

The method of one or more of these clauses, wherein the tool is a borescope, and wherein servicing the area of interest of the gas turbine engine comprises inspecting, with the borescope, the area of interest of the gas turbine engine.

A multi-tube assembly for servicing a gas turbine engine includes a tool, a preformed flexible guide tube, and a rigid guide tube. The tool includes a body and a distal end. The preformed flexible guide tube forms an internal passage that is configured to receive the tool. The rigid guide tube forms a central cavity extending through the rigid guide tube. The central cavity is configured to receive the preformed flexible guide tube and to allow the preformed flexible guide tube to pass through the rigid guide tube. An outer surface of the preformed flexible guide tube is disposed to slide relative to an inner surface of the rigid guide tube.

The multi-tube assembly of one or more of these clauses, wherein the preformed flexible guide tube includes a first portion with a shape that is non-linear.

The multi-tube assembly of one or more of these clauses, wherein the preformed flexible guide tube includes an axial centerline extending in an axial direction of the preformed flexible guide tube, wherein the axial centerline includes a curved portion.

The multi-tube assembly of one or more of these clauses, further comprising: wherein the multi-tube assembly is configured to perform visual inspection; and wherein the tool comprises a borescope.

The multi-tube assembly of one or more of these clauses, wherein the borescope comprises an image sensor disposed on the distal end.

We claim:

1. A method of servicing a portion of a gas turbine engine, the method comprising:
    inserting a rigid guide tube into an inspection port disposed in a shroud of the gas turbine engine;
    inserting a flexible guide tube into and through the rigid guide tube, wherein the flexible guide tube is pre-shaped such that the flexible guide tube is biased towards a predetermined shape after being inserted through the rigid guide tube and the flexible guide tube includes a tip shaped at an angle relative to an axial centerline of the tip, the angle being defined between an imaginary line perpendicular to the axial centerline and the tip, and the angle being greater than zero;
    pushing a tool through the flexible guide tube such that a distal end of the tool moves out of and away from the tip of the flexible guide tube; and
    servicing, with the tool, an area of interest of the gas turbine engine.

2. The method of claim 1, further comprising, before inserting the flexible guide tube into the rigid guide tube, inserting the tool into the flexible guide tube such that a distal end of the tool is positioned inside a portion of the flexible guide tube.

3. The method of claim 1, further comprising, before inserting the rigid guide tube into the inspection port, adjusting a rotor stage of the gas turbine engine such that rotor blades of the rotor stage are positioned in a predetermined location with respect to stator vanes of a stator stage of the gas turbine engine.

4. The method of claim 3, wherein inserting the flexible guide tube with the tool into the rigid guide tube comprises pushing the flexible guide tube, twisting the flexible guide tube, or both until the distal end of the flexible guide tube is positioned past one of the rotor stage, the stator stage, or both along an axial direction of the gas turbine engine.

5. The method of claim 4, wherein pushing or twisting the flexible guide tube comprises:
    contacting a rotor blade or a stator vane with a tip of the flexible guide tube; and
    sliding the tip of the flexible guide tube along the rotor blade or the stator vane as the flexible guide tube is being pushed or twisted.

6. The method of claim 3, wherein the area of interest of the gas turbine engine comprises a locking lug of the rotor stage.

7. The method of claim 6, further comprising determining an amount of protrusion of the locking lug relative to a baseline position of the locking lug.

8. The method of claim 1, further comprising:
    drawing the tool back into the flexible guide tube after the area of interest has been serviced; and
    drawing the flexible guide tube with the tool out of the rigid guide tube.

9. The method of claim 1, wherein the area of interest is not disposed along a line-of-sight from the inspection port disposed in the shroud of the gas turbine engine.

10. The method of claim 1, wherein pushing the tool through the flexible guide tube comprises pushing the tool until the distal end of the tool reaches the area of interest of the gas turbine engine.

11. The method of claim 1, wherein servicing the area of interest comprises positioning the distal end of the tool within a line-of-sight of the area of interest of the gas turbine engine.

12. The method of claim 1, wherein servicing the area of interest of the gas turbine engine comprises capturing imagery with an image sensor disposed on the distal end of the tool.

13. The method of claim 1, further comprising engaging the rigid guide tube with the inspection port such that the rigid guide tube connects to the inspection port.

14. The method of claim 13, wherein engaging the rigid guide tube with the inspection port further comprises connecting the rigid guide tube with an internal hole formed by an inner shroud of the gas turbine engine.

15. The method of claim 1, wherein the tool is a borescope, and wherein servicing the area of interest of the gas turbine engine comprises inspecting, with the borescope, the area of interest of the gas turbine engine.

16. A multi-tube assembly for servicing a gas turbine engine, the multi-tube assembly comprising:
a tool comprising a body and a distal end;
a preformed flexible guide tube, wherein the preformed flexible guide tube forms an internal passage configured to receive the tool and includes a tip shaped at an angle relative to an axial centerline of the tip, the angle being defined between an imaginary line perpendicular to the axial centerline and the tip, and the angle being greater than zero; and
a rigid guide tube, wherein the rigid guide tube forms a central cavity extending through the rigid guide tube, wherein the central cavity is configured to receive the preformed flexible guide tube and to allow the preformed flexible guide tube to pass through the rigid guide tube, wherein an outer surface of the preformed flexible guide tube is disposed to slide relative to an inner surface of the rigid guide tube.

17. The multi-tube assembly of claim 16, wherein the preformed flexible guide tube includes a first portion with a shape that is non-linear.

18. The multi-tube assembly of claim 16, wherein the preformed flexible guide tube includes an axial centerline extending in an axial direction of the preformed flexible guide tube, wherein the axial centerline includes a curved portion.

19. The multi-tube assembly of claim 16, further comprising:
wherein the multi-tube assembly is configured to perform visual inspection; and
wherein the tool comprises a borescope.

20. The multi-tube assembly of claim 19, wherein the borescope comprises an image sensor disposed on the distal end.

* * * * *